United States Patent [19]

Madjarac

[11] Patent Number: 5,690,316
[45] Date of Patent: Nov. 25, 1997

[54] TIMBER WEDGE

[76] Inventor: John Madjarac, 118 Chartin Rd., Blue Lake, Calif. 95525

[21] Appl. No.: 692,702

[22] Filed: Aug. 6, 1996

[51] Int. Cl.$^6$ .................................. B66F 3/00; B27L 7/00
[52] U.S. Cl. .......................................... 254/104; 144/195.7
[58] Field of Search ................. 254/104; 144/193.1, 144/195.7

[56] References Cited

U.S. PATENT DOCUMENTS

| | | | |
|---|---|---|---|
| 1,356,413 | 10/1920 | Staub | 254/104 |
| 2,328,661 | 9/1943 | Maloney | 254/104 |
| 4,327,787 | 5/1982 | Loratto | 254/104 |

*Primary Examiner*—W. Donald Bray
*Attorney, Agent, or Firm*—Donn K. Harms

[57] ABSTRACT

An improved timber wedge featuring an elongated wedge shaped body formed of natural materials such as wood or plastic or other synthetic material. The wedge shaped body is protected from hammer blows incurred during use by a removable impact protection cap mounted upon the striking end of the wedge which also reinforces the wedge body at the impact end. The cap is held to the body by a screw therethrough which friction mounts to cooperating threads in the wedge body interior or cooperatively engages a nut in an in line relationship with the screw and accessible from the side of the wedge. Releasable glue may also be used to hold the impact resistant cap to the wedge shaped body.

20 Claims, 2 Drawing Sheets

U.S. Patent    Nov. 25, 1997    Sheet 2 of 2    5,690,316
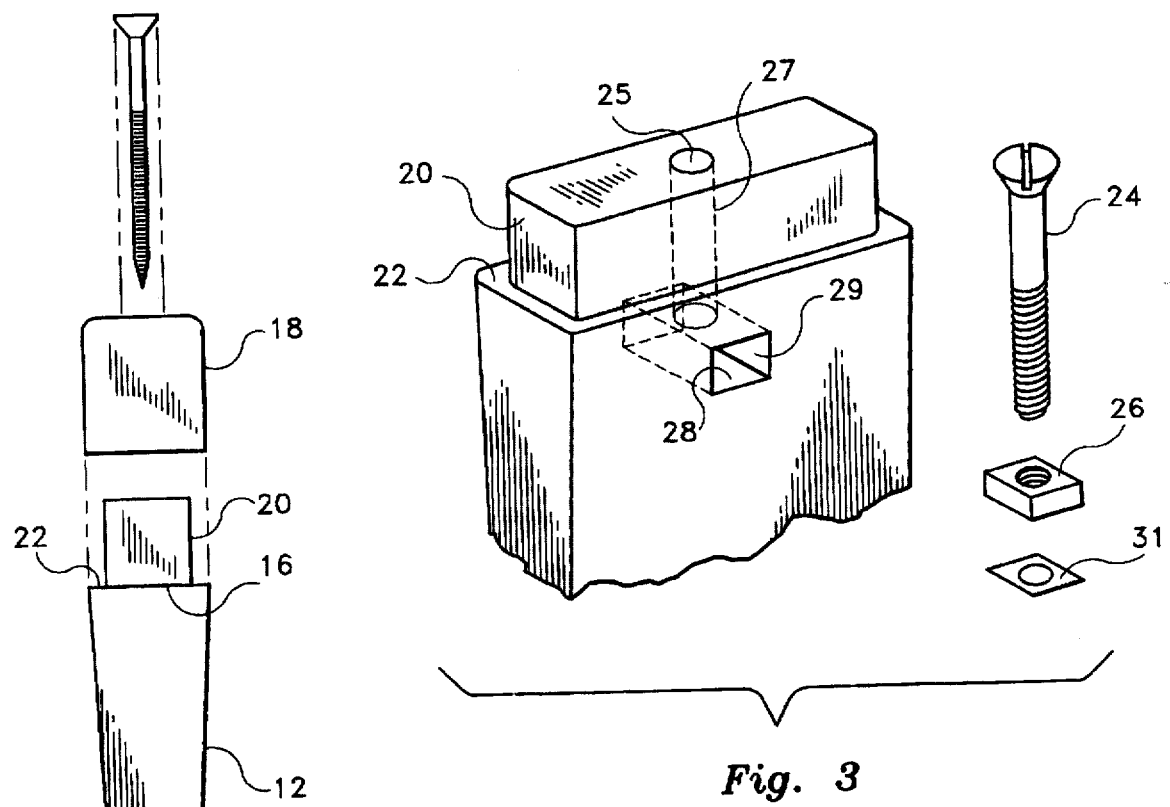
Fig. 3
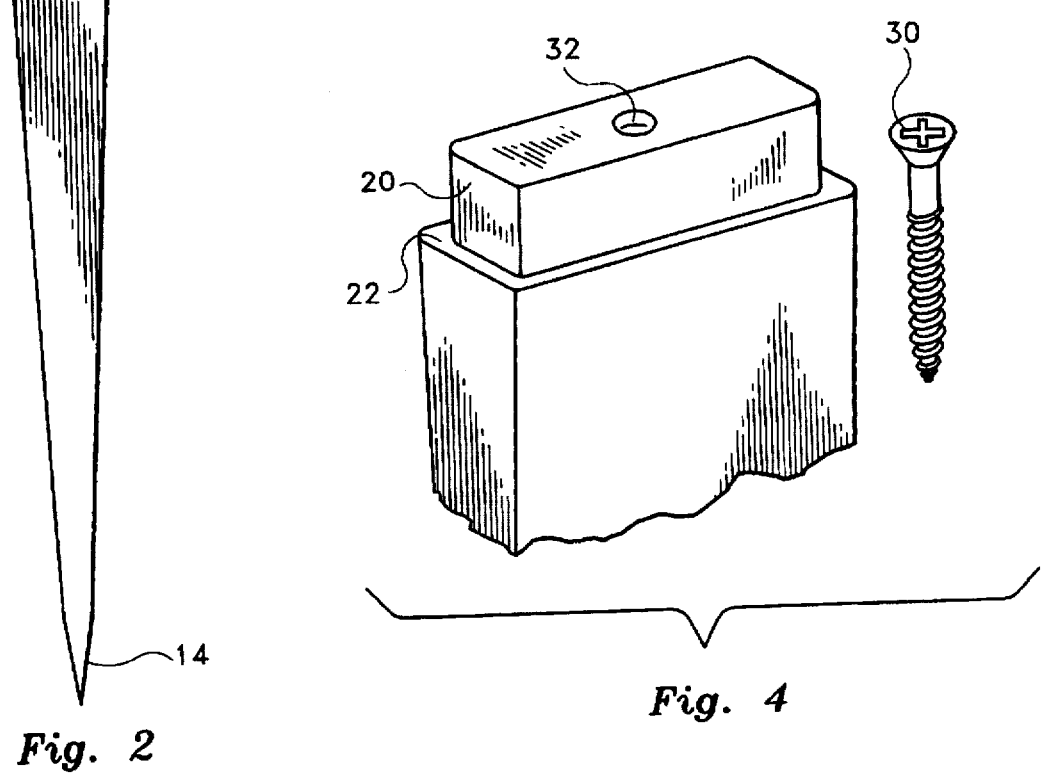
Fig. 2
Fig. 4

TIMBER WEDGE

BACKGROUND OF THE INVENTION

1. Field of the Invention

This invention relates to a device for the wedging of timber during the felling process. More particularly it teaches a wedge having a specially designed wood, plastic, or hybrid natural and syntectic body and a protective cap at upon the striking end of the wedge.

2. Prior Art

Throughout the world felling and bucking wedges have been used during the harvest of timber products. During the felling of timber with a chain saw or other cutting device, wedges are driven into the crack or kerf formed in the timber by the saw or other cutting tool between the timber being felled and the roots. Such placement of wedges in the void formed behind the saw keeps the tree from tilting back toward the void formed behind the saw such that the tree does not fall upon the saw and impede its progress through the timber. Properly placed, such wedges also allow the logger to drop the tree being felled in a desired position upon the ground.

Wedges have and are today constructed of various materials. Once such device formed entirely of metal such as steel is inherently dangerous when driven into the kerf behind an operational chain saw. Should the saw chain or guide bar on the chain saw contact the wedge during felling a tree, serious damage can occur to the chain saw equipment. Further, serious injury to the logger has resulted when the saw chain breaks upon such contact causing grave injury to loggers handling the saw.

Another popular wedge in use today is constructed from syntectic material such as plastic. Plastic can be cast or injection molded easily to the proper size wedge for the purpose intended by the logger. However such plastic wedges have an inherently short working life since in use they are struck by steel or other heavy metal hammers when driven into the kerf. The striking end of such a wedge quickly flattens and mushrooms out of square rendering it un-driveable into the narrow kerf seam.

The most popular wedge used in the logging industry currently is a hybrid of steel and plastic or other synthetic wedge body. This combination wedge features a synthetic material for the wedge body and a steel or a metal cap permanently attached to the striking end. This wedge too has its drawbacks. Since the entire wedge must be replaced when the synthetic portion cracks, chips, or becomes otherwise unusable, cost to the logger is increased and the environment is saddled with yet another piece of non biodegradable trash to fill another landfill.

Thus, there exists a need for an operational wedge for logging constructed of a plastic or other syntectic material with a removable striking end which would be capable of recycling rather than disposal. Such a wedge, having a removable and reattach able impact guard upon its striking end, would also reduce cost to the user since the cap may be reused and the syntectic wedge recycled. Another benefit would be reduced costs and use of energy due to the reduction of shipping weights.

U.S. Pat. No. 4,451,024 (Sheperd) teaches a felling wedge comprising a plastic main body portion and a cap of hard material. However, the cap is not removable since it has lugs which are inserted into the molten plastic material which forms into apertures in the lugs. Once the plastic cures during manufacture of Shepard, the metal end is rendered permanently secured to the plastic wedge body.

U.S. Pat. No. 188,376 (Kely) teaches a mechanism a wedge with a cavity on one end for the insertion of a metal strike plate. However Kelly as taught and claimed possesses two inherent problems when using it in the lumber industry. The metal portion is inserted into a cavity in one end of the wedge and easily dislodged. In the field, the two pieces would come apart too easily and get lost. Further, the cavity on the striking edge of the wedge seriously impairs the strength of the wedge body such that the body portion would tend to crumble or flatten when the inserted metal is hit hard. Finally, the metal portion would also tend to "bounce" out of the cavity when hit since nothing restrains it in the cavity.

U.S. Pat. No. 5,290,012 (Cottriel, et al) teaches a wedge for tree harvesting having a metal insert permanently molded into a syntectic body on the striking end of the body. Cottriel has the same defects as Kelly in that the striking end of the wedge is weakened by the formation of a cavity for a metal piece inserted therein. Blows to the striking end of the wedge would still cause a mushrooming of that end. Additionally, if permanently formed into the striking edge of the wedge the invention must be thrown away when damaged.

U.S. Pat. No. 3,381,937 (Zillman) teaches a wedge made from wood having a steel sheath covering the pointed end and a cavity at the striking end for a fork lift or other projection. Zillman is not easily recycled due to the permanent attachment of metal to both the point and striking end and is not suitable for striking upon the wider or striking end of the wedge.

U.S. Pat. No. 3,185,442, (Hemphill) teaches a timber wedge formed entirely of plastic material having grooved surfaces upon its upper and lower faces. Hempill however is subject to flattening or mushrooming at the striking or butt end of the wedge during use shorting its useful life considerably.

There thus exists a need for an improved timber wedge having a striking head which is reinforced or protected with a removable metal or otherwise impact resistant material striking head, capable of surviving the repeated impact forces of a hammer upon it which does not weaken the striking end of the wedge body itself and which is removably mounted upon the wedge body to allow for reuse of the striking head and recycling of the wedge body.

SUMMARY OF THE INVENTION

Applicant's device features a two piece timber wedge formed of a plastic, wood, or hybrid natural and syntectic material body portion and a steel or other metal striking component. The striking component is removably mounted over the outside of the butt end of the wedge.

The invention, by using a removably mounted strike end impact cap about the outside of the butt end of the wedge body reinforces the wedge body. Further, by removably mounting the strike end component or striking cap, with a screw or other attachment, the cap is sufficiently mounted for the hard use in the timber industry, but easily dismounted for reuse on another wedge body. Also, this removable mounting allows for the recycling of the wedge body itself, if made of plastic, since it can be easily remelted once the striking cap is removed for reuse.

In summary, the present invention is an improvement over those timber and other wedges currently in use in industry or taught in prior art. By using a removably mounted striking cap which reinforces the striking end about its circumference while allowing for tight, and adjustable, mount during use, and an easy dismount for reuse of the striking cap and recycling of the wedge body.

An object of this invention is to provide a timber wedge which has a reinforced striking edge.

Another object of this invention is to provide a timber wedge made of syntectic material which is easily cast or molded to the desire shape.

An object of this invention is to provide a timber wedge made of natural materials such wood which can be easily shaped to the proper or desired shape, with a removable, and reusable impact cap.

A further object of this invention is providing a reusable striking end for a timber wedge which is removably mounted in a fashion rendering it operable and adjustable in the field and easily removable for reuse of the striking end thus allowing for recycling of the wedge body.

Further objects of the invention will be brought out in the following part of the specification, wherein detailed description is for the purpose of fully disclosing the invention without placing limitations thereon.

BRIEF DESCRIPTION OF DRAWING FIGURES

FIG. 1 is a frontal perspective view of the wedge body 12 having the impact resistant cap 18 removably mounted upon the striking end 16 of the wedge body 12.

FIG. 2 is an exploded side view of the wedge body 12 showing the impact resistant cap 18 mountable upon the shoulder 20 formed upon the striking end 16 of the wedge body 12.

FIG. 3. Is a frontal view of the striking end 16 of the wedge body 12 showing an optional shoulder 20 or recess formed into the circumference of the striking end 16 of the wedge body 12 and attaching screw 24 and nuts 26 and 31 allowing for adjustable mounting and increased torque on the screw.

FIG. 4 is a frontal view of the striking end 16 of the wedge body 12 showing the optional shoulder 20 and an optional indentation 32 atop the shoulder portion. A frictionally engaging screw 30 is also pictured.

DETAILED DESCRIPTION OF THE FIRST PREFERRED EMBODIMENT OF THE INVENTION

Figure 1:
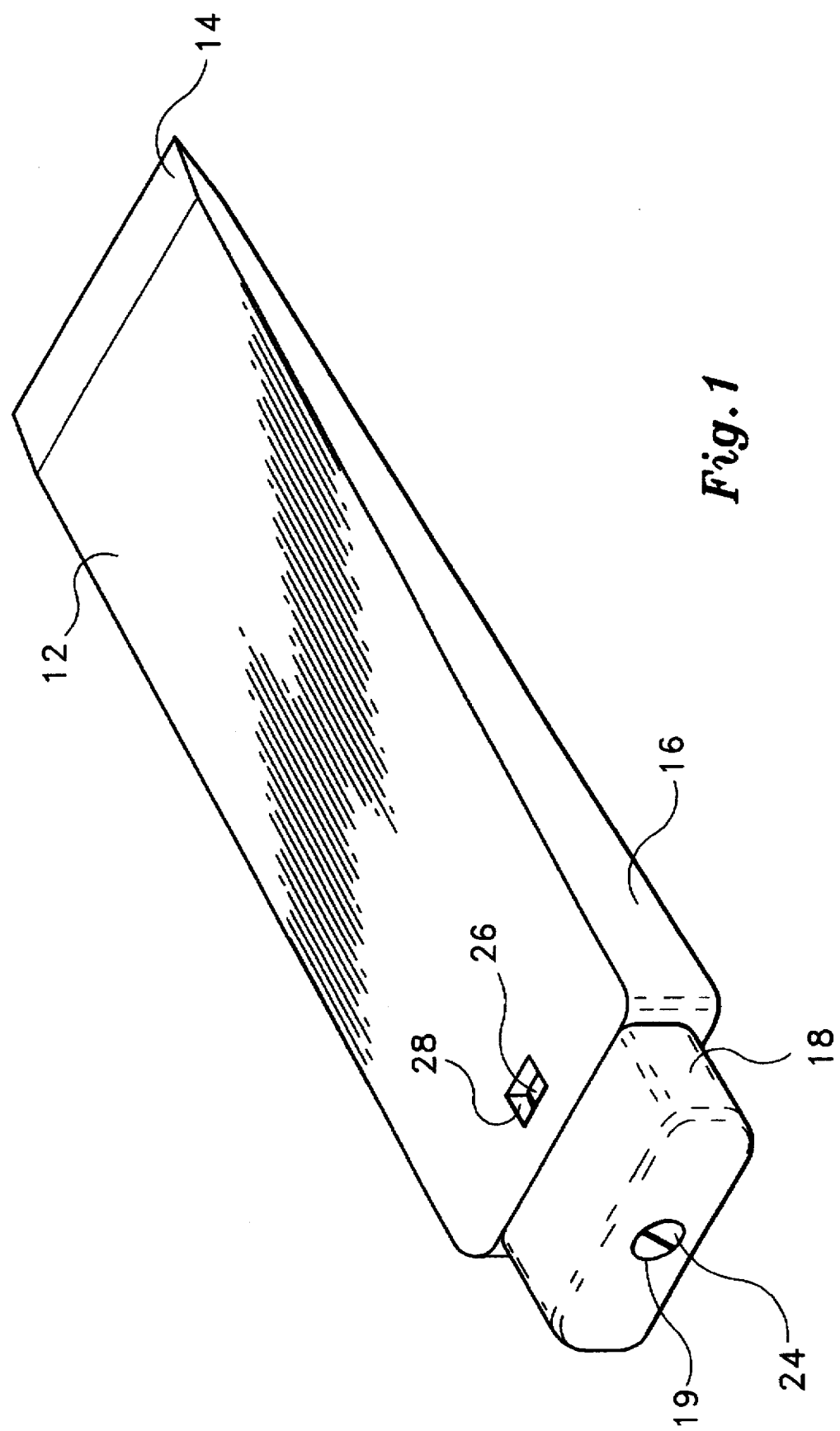

Referring now to the drawing Figures, specifically FIG. 1 is a frontal perspective view of the wedge body 12 having the impact resistant cap 18 removably mounted upon the striking end 16 of the wedge body 12. The body can be formed of any tough plastic material such as polypropylene, polyethylene, polystyrene, Teflon, polyvinlychloride, nylon, or mixtures thereof or of fiberglass and resin. Recycled plastics would also work well such as melted down soda bottles and milk cartons. The body could also be formed from wood or in some cases metal, needing an impact resistant cap, however metal runs the risk of engagement with the chain saw with dangerous consequences so a material should be chosen that will not cause damage or injury if the chain saw encounters the wedge during use and thus would not be the best embodiment of the invention.

The cap 18 is mounted upon a shoulder or recess (not shown) in the striking end 16 of the wedge body 12. This allows for better performance of the wedge invention in actual use in the field by maintaining a smooth surface on all four sides of the wedge body 12 where the sides intersect the cap 18. However there are occasions where the user may wish to texture one or more sides in situations where a wedge is required which will not easily back out of the tree. Grooves or some other texture can be easily placed in the plastic body 12 to achieve this surface. The cap can have an optional recess therein to allow for a flush surface of the screw 24 head and the cap surface. In use, when driven into the kerf behind a chain saw or other saw used to cut down a tree, it is desirable to have such smooth surfaces to avoid having the wedge invention sticking in the kerf or about the outside circumference of the tree due to projections from the surface of the wedge getting stuck in the wood of the tree. However the invention would perform with the cap 18 mounted upon the wedge body 12 without any such shoulder 20 and it is envisioned that some might prefer such an embodiment. The cap 18 should be made of impact resistant plastic material which will withstand repeated blows of a hammer or of metal which will better withstand constant hard blows during use such as steel, brass, aluminum, and bronze.

The cap 18 is held onto the shoulder 20 and the striking end 16 of the wedge body 12 using a screw 24 inserted though a cap aperture (not shown) in the cap 18. The cap aperture is placed in a position on the cap 18 such that it maintains an in-line communicating relationship with an axial bore (shown as 27 in FIG. 3). The axial bore 27 communicates with the striking end 16 of the wedge body 12 and an access aperture 28 formed in the wedge body 12. The access aperture 28 communicates with both faces of the wedge body 12 such that the user can see and access the nut 26 which receives the threaded end of the screw 24 in a cooperative relationship. Use of the screw 24 through the cap 18 and axial bore 27 to a nut 26 to hold the impact cap 18 upon the wedge body 12 allows the user to adjust the tightness of the impact cap 18 should blows from the hammer or compression of the impact end 16 of the wedge body 12 loosen the screw 24. Use of a nut on the other end of the screw also allows for more torque upon the screw 24 without worry of stripping the material in the body 12 which would occur with a wood or frictional engaging screw. The screw 24 can be made of metal such as steel or brass or aluminum and threaded to accept a nut or other retainment device. Nylon or other plastic screws or ratchet or zip screws and cooperating nuts or retainers would also work to hold the cap 18 into position, however metal screws appear to last longer and let the user achieve a tighter fit due to the strength of the metal material. The nut 26 or 31 can be a flat sheet metal type nut 21 or a standard nut 26 with interior threads for cooperative engagement with the screw 24. The nut can be the same metal as the screw or nylon material. The nut could also be cast into the wedge body 12 inside the access aperture 28 as in unitary structure with the wedge body 12 and threaded as needed to mate with the screw 24. Should no nut be desired, glue which can be later dissolved by heat or some other catalyst to allow removal could be used to attach the cap to the body.

An impact cap recess 24 is fitted to the dimensions of the screw head of the screw 24 such that the head will seat into the recess 24 just below the surface of the impact cap 18. In this manner a flush surface is maintained upon the top of the impact cap 18 and force from the blows of the hammer to not impact upon the screw in its recess. While the invention would work with the screw head rising above the surface of the impact cap 18, the screw 24 would be subjected to repeated blows and deformation from such abuse.

FIG. 2 is a side view of the wedge body 12 showing in exploded view the screw 24 prior to entry into the cap aperture (not shown) in line with the axial bore (shown in FIG. 3). The impact resistant cap 18 mounted upon the shoulder 20 formed upon the striking end 16 of the wedge body 12. In use, the shoulder 20 allows for the recess of the sides of the cap 18 to achieve a smooth working surface upon the wedge invention. When driven into a kerf the smooth sides aid the invention in working by not getting caught upon the wood in the tree.

FIG. 3. Is a frontal view of the striking end 16 of the wedge body 12 showing the optional shoulder 20 or recess formed into the circumference of the striking end 16 of the wedge body 12 and attaching screw 24 and conventional hex nut 26 and conventional sheet metal nut 31. Entry to the axial bore 27 is achieved through the screw entry aperture 25 which is in an in line relationship with the screw aperture in the cap 18. The cap 18 (See FIG. 1) is mounted upon the shoulder 20 and tightened and held thereon by the tightened screw 24 and nut 26. However, the nut could also be formed in the body 12 itself by threading the hold in the body to accept the threads of the screw 24. Using a metal nut 26 however achieves a better mount of the cap since the screw 24 may be torqued higher to achieve a tighter fit of the cap 18 without worry of stripping threads in the body 12 portion of soft plastic or wood material.

FIG. 4 is a frontal view of the striking end 16 of the wedge body 12 showing the optional shoulder 20 and an optional indentation 32 atop the shoulder portion and shows another embodiment of the invention which does not require a nut to hold the screw 30. A frictionally engaging screw 30 such as a conventional wood screw or conventional sheet metal screw is also pictured and can be self threaded into the body 12 or a pilot hole (not shown) could be placed in the body 12 for the screw 30. The striking end recess 32 is optional for all embodiments of the invention and allows for the use of a thinner impact cap 18 since part of the indentation needed by the screw head for a flush mount is achieved in the wedge body 12.

The cap in the embodiment of the invention shown in FIG. 4 is held on through the seating of the wood screw or sheet metal screw into the wedge body 10. The screw can be tightened as needed but not quite as tight as the screw in the embodiment of FIG. 1 since the wedge body material itself is not as strong as a metal nut 26 and too tight of a torque on the screw yields the possibility of stripping the body threads.

While all of the fundamental characteristics and features of the improved tubing support structure invention have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A wedge apparatus comprising:
   an elongated wedge shaped body formed of a non metallic material said wedge shaped body comprising:
   a striking end;
   a second end opposite said striking end;
   an upper surface and a lower surface both of said surfaces extending from said second end to said striking end;
   a pair of opposing side walls of determined dimension diverging from said second end to said striking end defining a calculated rise of said upper surface from said lower surface;
   a strike protection means located upon said striking end of said wedge shaped body whereby said striking end of said body is protected from impact; and
   an attachment means for removably mounting said strike protection means upon said striking end of said wedge shaped body.

2. The invention as defined in claim 1 wherein said strike protection means is a cap formed of impact resistant material comprising:
   a relatively flat strike plate having a striking face and an interior face;
   two pair of opposing side walls attached to said strike plate each having an exterior face and a cavity face forming a cavity defined by the interior face of said strike plate and the cavity face of said pair of opposing side walls said cavity formed to cooperatively engage said striking end of said wedge shaped body.

3. The invention as claimed in claim 2 wherein said attachment means is glue.

4. The invention as defined in claim 2 wherein said attachment means comprises a screw inserted through a screw aperture located in the striking face of said strike plate said screw frictionally engaged with the interior of said wedge shaped body.

5. The invention as defined in claim 2 wherein said attachment means comprises:
   an access aperture located in said wedge shaped body in communication with both said upper surface of said wedge shaped body and said lower surface of said wedge shaped body;
   an axial bore in said wedge body communication with both of said striking surface of said wedge shaped body and said access aperture;
   a screw aperture located in said strike plate of said cap communicating with said axial bore in an in-line relationship;
   a screw retainment means slightly larger than the diameter of said axial bore located in said access aperture having a screw accepting aperture therethrough said screw accepting aperture communicating with said axial bore in an in line relationship;
   a screw having a head end slightly larger that said screw aperture and a threaded end having threads designed for cooperative engagement with the interior of said screw accepting aperture whereby said cap is held upon said wedge body by said screw head end when said screw is engaged with said screw retainment means.

6. The invention as defined in claim 4 additionally comprising a recess in the striking surface of said strike plate said recess located about said screw aperture and shaped to cooperatively engage the head end of said screw whereby said head end of said screw is located in said recess in said strike plate below the striking surface of said strike plate.

7. The invention as defined in claim 5 additionally comprising a recess in the striking surface of said strike plate said recess located about said screw aperture and shaped to cooperatively engage the head end of said screw whereby said head end of said screw is located in said recess in said strike plate below the striking surface of said strike plate.

8. The invention as defined in claim 1 wherein said strike protection means is made of metal from a group including steel, brass, aluminum, and bronze.

9. The invention as defined in claim 2 wherein said cap is made of metal from a group including steel, brass, aluminum, and bronze.

10. The invention as defined in claim 2 wherein said cap is made of metal from a group including steel, brass, aluminum, and bronze.

11. The invention as defined in claim 5 wherein said screw retainment means is a nut threaded upon the surface of the screw accepting aperture in a manner calculated to cooperatively engage the threads upon the threaded end of said screw.

12. The invention as defined in claim 5 wherein said screw retainment means is part of said wedge body cast into the side wall of said access aperture in a unitary structure having threads formed about said screw accepting aperture.

13. The invention as defined in claim 5 wherein said screw retainment means and said screw are made of metal.

14. The invention as defined in claim 5 wherein said screw retainment means and said screw are composed of non metallic material.

15. The invention as defined in claim 1 wherein said wedge body is composed of plastic.

16. The invention as defined in claim 1 wherein said wedge body is comprised of a material consisting of polypropylene, polyethylene, polystyrene, Teflon, polyvinlychloride, nylon, recycled plastic, or mixtures thereof.

17. The invention as defined in claim 1 wherein said wedge body is comprised of fiberglass material impregnated with a hardened resin.

18. The invention as defined in claim 2 wherein said impact resistant material is formed from impact resistant plastic.

19. The invention as defined in claim 2 wherein said impact resistant material is metal.

20. The invention as defined in claim 2 wherein said impact resistant material is formed of metal from a group consisting of steel, bronze, brass, carbon steel, iron, aluminum, or mixtures thereof.

* * * * *